United States Patent Office

2,990,362
Patented June 27, 1961

2,990,362
PROCESS OF DENITROGENATING AND DE-WAXING A LUBRICATING OIL EXTRACT
Wilbur E. Fox, Flossmoor, Ill., assignor to Sinclair Refining Company, New York, N.Y., a corporation of Maine
No Drawing. Filed Jan. 28, 1957, Ser. No. 636,523
21 Claims. (Cl. 208—33)

My invention relates to the production of an oil useful in the processing of rubber.

It is important that rubber products, for example, sponge rubber weather stripping, which are to be used in contact with lacquered or enameled surfaces, such as automobile doors, not cause stains on the surfaces either at the point of contact or by migration into enamel adjacent to the rubber. Moreover, it is important that the rubber product adhere well to the surface. Many rubber products, however, stain lacquered or enameled surfaces or do not adhere well to surface. This staining or lack of adhesion can be caused by various ingredients in the rubber composition, but the oil used in the processing of the rubber is one of the more important ingredients which can cause undesirable stain or poor adhesion. Frequently, rubber products bleed out the oil causing unsightly stains on and poor adhesion to the lacquered or enameled surfaces. In addition to being non-staining and compatible with the rubber product, it is important, of course, that the oil used in processing also be a good plasticizer for the rubber.

I have found that the undesirable staining of the oil used in processing rubber is due to the presence of nitrogen bases and group I unsaturates and that the non-compatibility, or bleeding, is due to the presence of an excess of saturates. Thus, it has been found that a desirable oil must have essentially no nitrogen bases, not more than about 3 weight percent group I unsaturates and not more than about 50 weight percent of saturates, as determined by the Rostler analysis described below. While the oil should have essentially no nitrogen bases, for specification purposes, particularly in view of the test method being empirical, 1.0 maximum is a tolerable limit. Preferably, however, the oil has a content of 0.0 weight percent nitrogen bases. Also, to obtain better compatibility it is generally desirable to have a high viscosity oil, i.e., an oil with a viscosity of more than 750 SSU at 100° F. The maximum viscosity of the oil is limited by ease of dispensing it into the rubber composition, i.e., it must be sufficiently fluid to allow its addition to the mixing equipment.

I have determined that an oil having the following characteristics by the Rostler analysis (Test Method L.M. 3.26.5 RFC Rubber Laboratory Manual, July 1, 1953) is eminently suitable for the processing of rubber as it is non-staining, compatible, is a good plasticizer and does not cause poor adhesion of the rubber product to a surface:

Rostler analysis: Wt. percent
Asphaltenes _____ 0.0.
Nitrogen bases _____ 1.0 maximum
Group I unsaturates _____ 3.0 maximum
Group II unsaturates _____ 47.0 minimum
Saturates _____ 50.0 maximum My invention relates more particularly to a process for the preparation of a rubber processing oil which is non-staining and compatible, which does not interfere with adhesive properties and which has good plasticizing properties for processing rubber. Suitable rubber polymers include natural rubber, synthetic natural rubber prepared by polymerizing isoprene, butadiene-styrene polymers (GR-S), and chloroprene polymers (neoprene). It is also suitable as a non-staining extender for oil masterbatched GR-S polymers. I have found that such an oil can be prepared by treating a particular hydrocarbon oil stock in a particular manner, i.e., by subjecting a lubricating oil extract, obtained by the solvent extraction of a lubricating oil stock of substantial naphthenic constituency, particularly from Mid-Continent and naphthenic crudes, with a solvent selective for aromatics, to a concentrated sulfuric acid treatment and a solvent dewaxing treatment followed by a treatment of the acid-treated and dewaxed extract with an adsorbent earth. It is important that the starting material be carefully chosen so that acid-treating and dewaxing followed by earth finishing produces a hydrocarbon oil meeting the above requirements. I have found that to produce such an oil by this method, a lubricating oil extract, as defined above, must be used as the starting material.

The process of my invention comprises subjecting a lubricating oil extract, obtained by the solvent extraction of a lubricating oil stock of substantial naphthenic constituency with a solvent selective for aromatics, to a treatment with concentrated sulfuric acid in which the extract is contacted with sufficient acid to eliminate essentially all of the nitrogen bases from and to reduce group I unsaturates to not more than about 3 weight percent in the extract followed by treating the resulting acid oil with a solution effective to neutralize the acids and water washing the neutralized oil, and to a dewaxing treatment in which the extract is contacted with a solvent effective to remove waxy components of the extract and in an amount sufficient to reduce the saturates to not more than about 50 weight percent and to provide a pour point for the extract of about 0° to 25° F., followed by treating the acid-treated and dewaxed extract with an adsorbent earth. The acid-treating step and dewaxing step can be carried out in any sequence. The above quantities of nitrogen bases, group I unsaturates and saturates are determined by the Rostler analysis described above.

The lubricating oil extracts useful as starting materials in the process of my invention include the extracts obtained by the solvent extraction of a lubricating oil stock of a substantial naphthenic constituency with a solvent selective for aromatics and, also, include a particular type of extract which is obtained by further treating such a lubricating oil extract to separate a raffinate oil containing about 20 to 90 volume percent of the original extract oil. This separated raffinate oil is characterized by being less soluble in a solvent which is selective for aromatics than the unseparated portion. The extracts obtained by conventional extraction methods are referred to as those obtained by a single extraction to distinguish them from the separated oils.

The lubricating oil stocks useful in the prepartion of the lubricating oil extracts are obtained from crude oils of substantial naphthenic constituency as distinguished from paraffinic oils, e.g., Pennsylvania base oils. Particularly advantageous oils are Mid-Continent (mixed) and naphthenic crudes. Both distillate and residual lubricating oil stocks can be employed providing the viscosity is sufficiently high to yield an extract which upon further treatment will yield a processing oil having the desired viscosity.

The extracts, obtained by conventional extraction, useful in my invention preferably have a maximum A.P.I. gravity of about 20 and a viscosity range of about 60 to 800 SSU at 210° F. and a minimum viscosity of about 1000 SSU at 100° F. Also, they preferably have a ratio of group II unsaturates to saturates of about 1.0 minimum as determined by the Rostler analysis after a dewaxing treatment as described herein.

Solvents which can be used in the production of the extracts include particularly phenol but other solvents selective for aromatics such as nitrobenzene, furfural, and liquid sulfur dioxide are also useful. Such processes and extracts are well-known. For example, phenol extraction comprises passing a feed stock through a phenol treating tower, removing a raffinate oil from the top of the tower and removing an extract oil from the bottom and removing the phenol from the raffinate oil and extract oil by distillation.

The oil described above as separated raffinate oil is described more completely in pending application Serial No. 560,293, filed January 20, 1956, of Maurice K. Rausch and Thomas A. Francis. As described in that application, the separated oil is a select portion of an extract oil obtained by subjecting an extract oil, obtained in the extraction of lubricating oil stock with a solvent selective for aromatics, to a further separation to produce a raffinate oil including about 20 to 90 volume percent of the original extract oil. Advantageously, the extract oil subjected to further separation is one obtained in the production of a lubricating oil having a viscosity index of at least 85.

The separation can be accomplished by several methods. For example, where the extract oil being treated consists essentially of a blend of an extract oil and a paraffin distillate, the select portion desired can be separated by solvent extracting the blend with a solvent which is selective for aromatics, e.g., phenol or furfural, to obtain a raffinate yield of about 20 to 90 volume percent based on the blend, the optimum yield of extraction of the blend depending primarily upon the quantity of extract present. A yield of about 40 to 90 volume percent is particularly advantageous. A second general procedure for obtaining the select portion of extract oil involves phase separation. In this procedure, the extract is treated as a soluion in a solvent selective for aromatics, either alone or with various amounts of paraffin distillate, for example up to about 0.75 part of distillate per part of extract and preferably from about zero to 0.25 part of distillate per part of extract. To separate the desired raffinate fraction the solvent extract solution is subjected to conditions such that the solvency power of the solvent for a portion of the solublized oil is reduced and a phase separation occurs. This can be effected by the introduction of a non-solvent, e.g., water, or by lowering the temperature of the solution sufficiently to effect a phase separation, or by a combination of injection of a non-solvent and the lowering of temperature.

The separated oils useful in my invention preferably have a maximum A.P.I. gravity of about 24, a viscosity range of about 60 to 400 SSU/210° F., and a ratio of group II unsaturates to saturates of about 1.0 minimum as determined by the Rostler analysis after a dewaxing treatment as described herein.

The acid treating step of the process of my invention comprises contacting the extract with concentrated sulfuric acid, separating sludge from the resulting acid oil, neutralizing the acid oil with a solution effective to neutralize the acid oil and then washing the neutralized oil with water to remove excess caustic and some sulfonate soaps. The amount of concentrated (93% to 98%) sulfuric acid used must be sufficient to reduce nitrogen bases to less than 1.0 weight percent and reduce group I unsaturates to not more than about 3 weight percent in the extract. Generally, from about 10 to 400 pounds of 93–98 percent sulfuric acid per barrel of extract are sufficient but this can vary depending on the characteristics of the extract. When using separated oil, advantageously, about 10 to 150 pounds of 93–98 percent acid per barrel of oil are used. When using unseparated extract, advantageously, about 100 to 400 pounds of 93–98 percent acid per barrel of oil are used. The temperature of acid treating can range from about 80° to 150° F. and preferably about 80° to 100° F. Advantageously, an inert diluent, for example, naphtha or a light lube oil (e.g. 100 SSU/100° F. maximum viscosity) is used in the treating of viscous extracts. The primary requirement for the inert diluent is that it can be removed from the treated oil by distillation. The sludge is removed from the acid oil by settling and a pepper blow can be used to remove fine sludge. Solutions of sodium hydroxide or sodium carbonate are preferred for the neutralization step although other neutralizing agents can be used. The strength and amount of neutralizing solution is not critical provided that at least 120 percent of the theoretical amount required, based on the acid number of the acid oil, is used.

The neutralized oil is water washed until both oil and wash are neutral to phenolphthalein or a similar indicator. Any of the common washing procedures such as spray washing or air blowing a water wash can be employed. I have found, however, that it is important that the water washing step of particularly heavy stocks be carried out by spray washing to reduce the tendency for formation of troublesome emulsions during the washing step. Air blowing a water wash or steam breaking results in troublesome emulsions. The use of spray washing, however, effectively reduces the tendency for emulsion formation.

The solvent dewaxing step of the process of my invention is carried out by contacting the extract with a solvent effective to remove waxy components and in an amount sufficient to reduce the saturates in the extract to not more than about 50 weight percent and to reduce the pour point to about 0° to 25° F. The manner of contacting is conventional, i.e. is carried out by admixing oil and solvent and passing the mixture through a chiller and then to a filter to remove wax and distilling the solvent from the dewaxed oil. The solvents effective for this purpose are well-known and include, for example, methyl ethyl ketone admixed with benzene and/or toluene, propane, and a mixture of ethylene dichloride and benzene. Generally, when the pour point of the extract has been reduced to about 0° to 25° F., the saturates are not more than about 50 percent. While the extract to be dewaxed may already have a saturates content of less than 50 weight percent dewaxing must be carried out in any event to provide a pour point of 0° to 25° F. in order to provide good processing properties for the finished oil. Generally, about 100 to 600 percent of solvent based on the oil is sufficient but this can vary with the characteristics of the extract. Generally, filter temperatures of about 0° to −20° F. are used.

The absorbent earth finishing step of the process of my invention comprises contacting the acid treated and dewaxed extract with an adsorbent earth such as an adsorbent clay. The treatment removes any sodium sulfonate soaps remaining in the extract from the acid treating step along with residual acids, solvents or other impurities and improves odor and color stability. It is important to remove soaps from the treated oil since if oil containing soaps becomes contaminated with water, e.g. during shipment or storage, a moisture haze or partial emulsification would occur and the oil would be useless as a rubber processing oil. Preferably, the treatment is carried out at a temperature of about 200° to 400° F. Generally, a dosage of about 5 to 20 pounds of earth per barrel of treated extract is sufficient but this amount can vary with the nature of the extract and the processing conditions of acid-treating and dewaxing steps. The treatment can be carried out by direct contact of the extract with the earth in the well-known manner of contact filtration wherein finely divided clay is admixed with the oil to form a slurry which is heated for a period of time and the oil then separated. Alternatively, the well-known percolation filtration method can be used wherein the earth is packed in a tower and oil is charged to the top and percolates through the bed of earth and the filtered oil is removed from the bottom of the tower. By the term "adsorbent earth," I mean to include the earths conventionally used in such treatment, e.g. fuller's earth, bauxite, and various activated clays.

The process of this invention will be further illustrated by reference to the following examples:

EXAMPLE I

A lubricating oil extract obtained from the phenol extraction of a Mid-Continent 70 SSU/210° F. raw lubricating oil stock to a 95 viscosity index level was acid treated, solvent dewaxed and earth finished. The characteristics of the extract charge stock and the details of each treating step and characteristics of the finished processing oil are set forth below in Table I.

The results show that the finished oil meets the requirements discussed above in terms of content of nitrogen bases, group I unsaturates and saturates and in terms of viscosity.

EXAMPLE II

The extract obtained by the phenol extraction of a Mid-Continent 70 SSU/210° F. raw lubricating oil stock to a 95 viscosity index level was further treated with phenol to a raffinate yield of 74.9 volume percent. This separated oil was then solvent dewaxed, treated with concentrated sulfuric acid, and earth finished.

The characteristics of the separated oil and conditions of treatment to produce the separated oil, the conditions of dewaxing and acid-treating and earth contacting and the characteristics of the finished processing oil are set forth below in Table II.

The results show that the finished oil meets the requirements discussed above in terms of content of nitrogen bases, group I unsaturates and saturates and in terms of viscosity.

Table II

| Treating Conditions | Extract Oil | Separated Oil | Dewaxed Oil | Finished Processing Oil |
|---|---|---|---|---|
| Extract Oil Separation: | | | | |
| Temperature, °F | | 105 | | |
| Phenol, Vol. Percent | | 425 | | |
| Water Content of Phenol, Vol. Percent | | 15 | | |
| MEK Dewaxing (Batch):[1] | | | | |
| Percent Primary Solvent | | | | 500 |
| Percent Wash Solvent | | | | 300 |
| Filter Temperature, °F | | | | −5 |
| Sulfuric Acid Treating:[2] | | | | |
| Acid Strength, Percent | | | | 98 |
| Acid Dosage Each Dump, Lb./Bbl | | | | 30 |
| Number of Dumps | | | | 2 |
| Total Acid Dosage, Lb./Bbl | | | | 60 |
| Temperature, °F | | | | 85–105 |
| Clay Contacting: | | | | |
| Clay | | | | Attapulgus |
| Clay Dosage, Lb./Bbl | | | | 10 |
| Temperature, °F | | | | 200 |
| Yield of Finished Oil, Wt. Percent | | | | 57.3 |
| Test on Stocks: | | | | |
| Gravity, °API | 17.0 | 21.2 | 19.9 | 21.0 |
| Flash, °F | 505 | 500 | 500 | 500 |
| Fire, °F | 595 | 590 | 590 | 590 |
| Viscosity at 100 °F. SSU | | | 1,787 | 1,430 |
| Viscosity at 210 °F. SSU | 102.3 | 82.5 | 91.35 | 84.6 |
| Pour, °F | 100 | 110 | 15 | 15 |
| Rostler Analysis, Wt. Percent: | | | | |
| Asphaltenes | | | 0.0 | 0.0 |
| Nitrogen Bases | | | 1.9 | 0.0 |
| Group I Unsaturates | | | 8.5 | 1.2 |
| Group II Unsaturates | | | 50.0 | 51.9 |
| Saturates | | | 39.6 | 46.9 |

[1] Solvent composition: 50% methyl ethyl ketone, 25% toluene and 25% benzene.
[2] After sludge was drawn, the acid oil was neutralized with ½% of 20% caustic solution. Excess caustic was removed by spray washing.

Table I

| Treating Conditions | Charge Stock | Processing Oil |
|---|---|---|
| Sulfuric Acid Treating:[1] | | |
| Acid Strength, Percent | | 98 |
| Acid Dosage Each Dump, Lb./Bbl | | 60 |
| Number of Dumps | | 6 |
| Total Acid Dosage, Lb./Bbl | | 360 |
| Diluent | | Naphtha |
| Percent Diluent | | 300 |
| Temperature, ° F | | 85–115 |
| Dewaxing (batch):[2] | | |
| Percent Primary Solvent | | 500 |
| Percent Wash Solvent | | 300 |
| Filter Temperature, ° F | | −5 |
| Clay Contacting: | | |
| Clay | | Attapulgus |
| Clay Dosage, Lb./Bbl | | 10 |
| Temperature, ° F | | 200 |
| Yield of Finished Oil, Wt. Percent | | 50.8 |
| Tests on Stocks: | | |
| Gravity, ° API | 13.8 | 17.2 |
| Flash, ° F | | 435 |
| Fire, ° F | | 515 |
| Viscosity at 100° F. SSU | | 1,828 |
| Viscosity at 210° F. SSU | 95.3 | 89.3 |
| Pour, ° F | | 75 | 20 |
| Aniline Point, ° C | | 67.0 |
| Rostler Analysis, Wt. Percent: | | |
| Asphaltenes | 0.0 | 0.0 |
| Nitrogen Bases | 10.2 | 0.0 |
| Group I Unsaturates | 16.4 | 1.0 |
| Group II Unsaturates | 51.5 | 68.5 |
| Saturates | 21.9 | 30.5 |

[1] After the sludge was drawn, the acid oil was neutralized with ½% of 20% caustic solution. Excess caustic was removed by spray water washing, and the naphtha distilled from the oil.
[2] Solvent composition: 50% methyl ethyl ketone, 25% toluene and 25% benzene.

EXAMPLE III

Tests were conducted to determine the effectiveness of the rubber processing oils produced by the process of this invention.

The properties tested include the evaluation of stain, adhesion and compatibility of rubber compounds containing the oil.

For strain evaluation, the test consisted of incorporating the processing oil into a non-staining rubber composition which was then fastened to a steel panel which had been painted with a light grey lacquer. The test panel was exposed under an ultra-violet light at 135° to 145° F. for 24 hours. The rubber specimen was then removed and the lacquered surface examined for discoloration.

Compatability and adhesion are important in that a non-compatible oil will gradually exude to the surface and break the adhesion between the rubber molding and enameled surface. This is determined by visual and physical examination of a sample of weather stripping which has been cemented to an enameled metal surface and allowed to age under room conditions for about 30 days. The weather stripping consists of sponge rubber coated with a dense outer rubber skin. The sponge rubber contains 50–60 parts processing oil prer 100 parts rubber and the outer skin 10 parts oil per 100 of rubber. Other ingredients include non-staining anti-oxidants, non-staining carbon blacks, waxes, accelerators (fatty acids, zinc oxide), and vulcanizers (sulfur).

Processing characteristics are evaluated by observing ease of mixing of ingredients and measuring power consumed and time required to obtain a uniform mixture.

The results are tabulated below in Table III.

Oil A is the finished processing oil of Example I. Its characteristics are set forth below again for convenience of comparison with unsatisfactory oils B and C.

Oil B is a typical aromatic rubber processing oil, having the characteristics set forth below, which was prepared by dewaxing the extract charge stock of Example I. The extract was not acid-treated. Thus, the oil contains, as shown below, both nitrogen bases and group I unsaturates.

Oil C is a rubber processing oil, having the characteristics set forth below, which was prepared by treating the extract charge stock of Example I with 360 pounds per barrel of 85% sulfuric acid and then dewaxing. It contains some nitrogen bases and a high content of group I unsaturates.

Oil D is a conventional lubricating oil prepared by acid-treating a raw Mid-Continent lubricating oil stock with 30 pounds per barrel of 98% sulfuric acid followed by dewaxing and earth percolation through fuller's earth. The oil has a high content of group I unsaturates, a low content of group II unsaturates and a slightly high content of saturates.

Oil E is a dewaxed solvent-refined (with phenol) Mid-Continent lubricating oil which has been subsequently acid-treated with 10 pound per barrel of 98% sulfuric acid followed by earth percolation through fuller's earth. The oil has a low content of group II unsaturates and a high content of saturates.

| Tests | Desired | A | B | C | D | E |
|---|---|---|---|---|---|---|
| Gravity, °API | | 17.2 | 13.3 | 13.9 | 25.3 | 27.1 |
| Flash, °F | | 435 | 430 | 455 | 440 | 530 |
| Fire, °F | | 515 | 500 | 505 | 510 | 610 |
| Viscosity, SSU @ 100 °F | | 1,828 | 3,500 | 2,471 | 876 | 1,728 |
| Viscosity, SSU @ 210 °F | | 89.3 | 103.6 | 93.6 | 79.0 | 118.3 |
| Viscosity, Index | | 24.8 | −41.2 | −13.7 | 87.0 | 93.3 |
| Pour, °F | | 20 | 15 | 10 | 5 | 5 |
| Optical Density Color | | 47 | 1,700 | 119 | | |
| Aniline Point, °C | | 67.0 | 49.7 | 57.1 | 105.2 | 121.7 |
| Rostler Analysis, Wt. Percent: | | | | | | |
| Asphaltenes | 0.0 | 0.0 | 0.0 | 0.0 | 0.0 | 0.0 |
| Nitrogen Bases | 1.0 Max. | 0.0 | 6.6 | 0.3 | 0.5 | 0.0 |
| Group I Unsaturates | 3.0 Max. | 1.0 | 17.2 | 13.8 | 6.5 | 2.5 |
| Group II Unsaturates | 47.0 Min. | 68.5 | 56.0 | 64.6 | 40.5 | 8.1 |
| Saturates | 50.0 Max. | 30.5 | 20.2 | 21.0 | 52.5 | 89.4 |

*Table III*

| | A | B | C | D | E |
|---|---|---|---|---|---|
| Adhesion and Compatibility | Good | Excellent | Excellent | Fair | Poor |
| Stain | None | Pronounced | Slight | Very Slight | None |
| Processibility | Excellent | Good | Good | Good | Poor |

It is seen from the above results that the rubber processing oil B not having the desired characteristics, particularly as to amount of nitrogen bases and group I unsaturates, produces a pronounced stain. Oil C, while having a low nitrogen base content, had a high content of group I unsaturates and also produced staining. Oil D, while having a low nitrogen base content, had a high group I unsaturates content and produced a very slight stain and also, due to its high saturates content had only fair adhesion and compatability properties. Oil E, while having a low nitrogen base and group I unsaturates content, had a low group II unsaturates content and a high saturates content resulting in poor processibility and poor adhesion and compatability.

The rubber processing oil A produced by the process of my invention with desired characteristisc is, however, non-staining, has good adhesion and compatability and excellent processibility.

The results also show that not only is acid-treating necessary to produce a suitable oil (see unsatisfactory oil B which was not acid-treated) but also that sufficient acid of proper strength must be used as shown by unsatisfactory oil C which was treated with 360 pounds per barrel of 85% acid while satisfactory oil A was treated with 360 pounds per barrel of 98% acid.

I claim:

1. The processing of preparing a hydrocarbon oil useful in the processing of rubber including the steps of subjecting a lubricating oil extract, obtained by the solvent extraction of a lubricating oil stock derived from a crude oil of substantial naphthenic constituency with a solvent selective for aromatics, containing nitrogen bases and group I unsaturates to a treatment with concentrated sulfuric acid including the steps of contacting the extract with sufficient sulfuric acid to reduce nitrogen bases in the extract to not more than about 1 weight percent and to reduce group I unsaturates in the extract to not more than about 3 weight percent followed by treating the acid-treated oil with an agent effective to neutralize the acid oil and water washing the neutralized oil, and to a dewaxing treatment including the step of contacting the extract with solvent effective to remove waxy components of the extract and in an amount sufficient to reduce the saturates in the extract to not more than about 50 weight percent and to provide a pour point of about 0° to 25° F., followed by treating the acid-treated and dewaxed extract with an adsorbent earth, the amount of said nitrogen bases, group I unsaturates and saturates being determined by a Rostler analysis.

2. The process of claim 1 in which the lubricating oil extract is obtained by a single solvent extraction of a lubricating oil stock derived from a crude oil of substantial naphthenic constituency with a solvent selective for aromatics.

3. The process of claim 1 in which the lubricating oil extract is obtained by separating from an extract oil obtained in the solvent extraction of a lubricating oil stock derived from a crude oil of substantial naphthenic constituency with a solvent selective for aromatics, a raffinate oil which includes about 20 to 90 volume percent of the extract oil, said separated oil being characterized by being less soluble in a solvent which is selective for aromatics than the unseparated portion.

4. The process of claim 1 in which the acid-treating step procedes the dewaxing step.

5. The process of claim 1 in which the dewaxing step precedes the acid-treating step.

6. The process of preparing a hydrocarbon oil useful in the processing of rubber including the steps of subjecting a lubricating oil extract, obtained by the solvent extraction of a lubricating oil stock derived from a crude oil of substantial naphthenic constituency with a solvent selective for aromatics, to a treatment with concentrated sulfuric acid including the steps of contacting the extract with about 100 to 400 pounds of concentrated sulfuric acid per barrel of extract followed by treating the resulting acid oil with a solution effective to neutralize the acid oil and water washing the neutralized oil, and to a dewaxing treatment including the steps of contacting the extract with a solvent effective to remove waxy components of the extract and in an amount sufficient to produce an extract with a pour point of about 0° to 25° F. followed by treating the acid-treated and dewaxed extract with an adsorbent earth.

7. The process of claim 6 in which the crude oil is a Mid-Continent crude oil.

8. The process of claim 6 in which the crde oil is a naphthenic base crude oil.

9. The process of claim 6 in which the solvent used in the extraction step is phenol.

10. The process of claim 6 in which the solvent used in the dewaxing step comprises ethyl ethyl ketone.

11. The process of claim 6 in which the dewaxing step precedes the acid-treating step.

12. The process of preparing a hydrocarbon oil useful in the processing of rubber including the steps of subjecting a lubricating oil extract, obtained by separating from an extract oil obtained by the solvent extraction of a lubricating oil stock derived from a crude oil of substantial naphthenic constituency with a solvent selective for aromatics a raffinate oil which includes about 20 to 90 volume percent of the extract oil, said separated oil being characterized by being less soluble in a solvent which is selective for aromatics than the unseparated portion, to a treatment with concentrated sulfuric acid including the steps of contacting the separated oil with about 10 to 150 pounds of concentrated surfuric acid per barrel of oil followed by treating the resulting acid oil with a solution effective to neutralize the acid oil and water washing the neutralized oil, and to a dewaxing treatment including the steps of contacting the separated oil with a solvent effective to remove waxy components in the oil and in an amount sufficient to produce an oil with a pour point of about 0° to 25° F. followed by treating the acid-treated and dewaxed oil with an adsorbent earth.

13. The process of claim 12 in which the crude oil is a Mid-Continent crude oil.

14. The process of claim 12 in which the crude oil is a naphthenic base crude oil.

15. The process of claim 12 in which the solvent used in the extraction step is phenol.

16. The process of claim 12 in which the solvent used in the dewaxing step comprises methyl ethyl ketone.

17. The process of claim 12 in which the dewaxing step precedes the acid-treating step.

18. The process of claim 1 in which the solvent used in the extraction step is phenol.

19. The process of claim 2 in which the solvent used in the extraction step is phenol.

20. The process of claim 3 in which the solvent used in the extraction step is phenol.

21. The process of claim 1 in which the neutralizing agent is a solution of an agent selected from the group consisting of sodium hydroxide and sodium carbonate.

References Cited in the file of this patent
UNITED STATES PATENTS

| | | |
|---|---|---|
| 1,949,989 | Bray | Mar. 6, 1934 |
| 2,006,095 | Bray et al. | June 25, 1935 |
| 2,085,545 | Retailliau | June 29, 1937 |
| 2,175,437 | Lazar et al. | Oct. 10, 1939 |
| 2,199,931 | Walsko | May 7, 1940 |
| 2,205,613 | Bahlke et al. | June 25, 1940 |
| 2,218,133 | Lovell | Oct. 15, 1940 |
| 2,263,176 | Lazar et al. | Nov. 18, 1941 |
| 2,704,758 | Wetzel | Mar. 22, 1955 |